H. Bullard.
Coffee Pot.
N° 79,726.                         Patented Jul. 7, 1868.
Fig. 1.                Fig. 2.
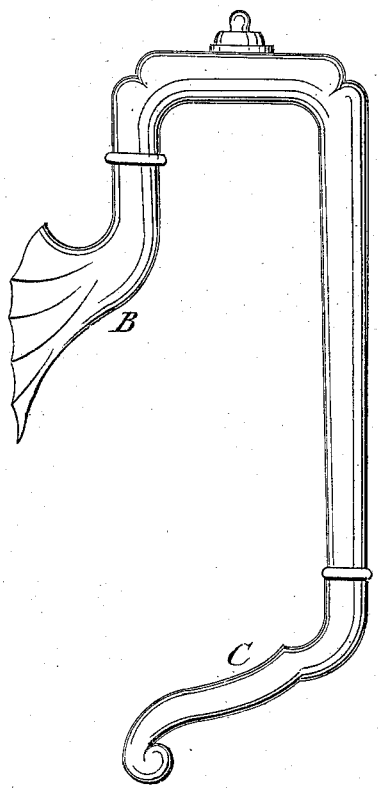
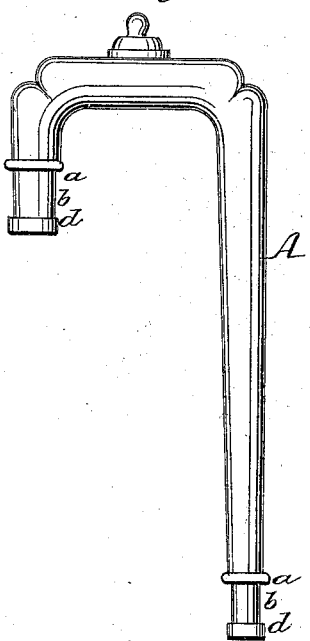
Fig. 3.
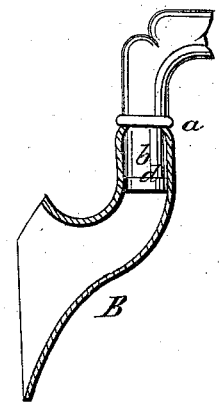
Witnesses
J. H. Shumway
A. J. Tibbits
Inventor.
Henry Bullard.
By his Attorney
John E. Earle

United States Patent Office.

HENRY BULLARD, OF MIDDLETOWN, CONNECTICUT.

Letters Patent No. 79,726, dated July 7, 1868.

IMPROVEMENT IN HANDLES FOR TEA AND COFFEE-POTS.

*The Schedule referred to in these Letters Patent and making part of the same.*

TO ALL WHOM IT MAY CONCERN:

Be it known that I, HENRY BULLARD, of Middletown, in the county of Middlesex, and State of Connecticut, have invented a new Improvement in Handles for Tea and Coffee-Pots; and I do hereby declare the following, when taken in connection with the accompanying drawings, and the letters of reference marked thereon, to be a full, clear, and exact description of the same, and which said drawings constitute part of this specification, and represent, in—

Figure 1, a side view, with the tips detached.

Figure 2, the same, detached from the tips; and in

Figure 3 a vertical section, showing the manner of attachment.

This invention relates to an improvement in the construction of handles for tea and coffee-pots, and consists in forming the handle proper from hard rubber, or similar plastic material, and so that the tips may be attached thereto without the intervention of other material than the tips and handle proper.

In order to the clear understanding of my improvement, I will fully describe the same as illustrated in the accompanying drawings.

A is the handle, as seen in fig. 2, and may be of any desirable form and configuration of design, formed from hard rubber, or similar plastic material, by making a mould corresponding to the form desired, and compressing the material into the said mould, in the usual manner of forming articles from hard rubber, and cured or hardened by a process applicable to the material used.

The ends, to which the metallic tips B and C are to be attached, I form so as to leave a shoulder, $a$, above a recess or reduced diameter, $b$, below which is formed another shoulder, $d$, as seen in fig. 2, and construct the tips to correspond to their respective ends, so as to set on the lower and against the upper shoulder, as seen in fig. 3, and when so set, the notch of the tip is compressed into the reduced portion, so as to secure the tip to the handle, the tips themselves being secured to the tea or coffee-pot in the usual manner.

The handle thus constructed may be of any desirable color, and being a non-conductor of heat, is peculiarly adapted for this purpose, is exceedingly strong, and much cheaper than the metallic handle heretofore used.

Having thus fully described my invention, what I claim as new and useful, and desire to secure by Letters Patent, is—

Handles for tea and coffee-pots, formed from hard rubber or similar material, and so as to be attached to the tips B and C, substantially in the manner herein set forth, as a new article of manufacture.

HENRY BULLARD.

Witnesses:
ELMORE PENFIELD,
EDWARD PAYNE.